United States Patent [19]

Holzschuh

[11] 4,287,580
[45] Sep. 1, 1981

[54] MINIATURIZED SCAN WITHIN A PULSE SONAR

[75] Inventor: Jack E. Holzschuh, Kailua, Hi.

[73] Assignee: The United States of America as represented by the Secretary of the Navy, Washington, D.C.

[21] Appl. No.: 109,940

[22] Filed: Jan. 4, 1980

[51] Int. Cl.³ .......................... G01S 15/42; G01S 3/84
[52] U.S. Cl. ..................................... 367/105; 367/122
[58] Field of Search ........................ 367/105, 122, 123

[56] References Cited

U.S. PATENT DOCUMENTS

| | | | |
|---|---|---|---|
| 3,163,844 | 12/1964 | Martin | 367/122 |
| 4,166,999 | 9/1979 | Brady | 367/105 |

*Primary Examiner*—Richard A. Farley
*Attorney, Agent, or Firm*—Richard S. Sciascia; Ervin F. Johnston

[57] ABSTRACT

An improvement for a sonar is provided wherein the improvement includes a line array of N listening transducer elements, each listening element being capable of receiving an acoustic signal and outputting a corresponding electrical signal. A plurality of beamformers is provided wherein each beamformer has an input and an output, the input of each beamformer receiving the output from each listening element. A switching device is interconnected between the listening elements and the beamformers for alternately switching the outputs of the listening elements to each beamformer between two modes, one mode being a predetermined order and the other mode being an inversion of the predetermined order. With this arrangement only half the normal number of beamformers is required, thereby significantly reducing the weight and size of the sonar.

9 Claims, 5 Drawing Figures

FIG.3 (COS or SIN DIFF AMP FOR BEAMFORMERS 2-9)

FIG.4 (COS DIFF AMP FOR BEAMFORMER 1)

MINIATURIZED SCAN WITHIN A PULSE SONAR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Unmanned undersea vehicles are utilized by both the military and commercial enterprises for salvage operations and underwater construction projects. Scanning sonars are indispensable as "eyes" for these undersea vehicles. As the unmanned undersea vehicles get smaller and smaller, the sonar becomes a significant load for the vehicle. There is a need for a small scanning sonar, in the order of the size of a cigar box, that can act as the "eyes" of a small unmanned undersea vehicle so that the load on the vehicle is minimized.

Presently, scanning sonars are built in either one of two ways. One type utilizes curved transducer arrays, and the beams are formed using overlapping sectors on the curved arrays or the beams are formed by mechanical scanning. The disadvantages of the curved array sonar is in the cost and the required beamforming hardware. The cost of the curved arrays is significantly greater than the cost of a linear array. Secondly, each beam requires a unique beamformer since each beam uses different elements of the array. The disadvantage of the mechanically scanned sonar is the mechanical scanner. A mechanical scanner is large and heavy, and is slow in scanning. Accordingly the mechanically scanned sonar has a much lower information rate than that of an electronically scanned sonar.

SUMMARY OF THE INVENTION

A miniaturized scanning sonar is provided for utilization where size and weight of the sonar are important, such as utilization on a small unmanned undersea vehicle. This has been accomplished by providing the sonar with a line array of listening transducer elements wherein each listening element is capable of receiving an acoustic signal and outputting a corresponding electrical signal. A plurality of beamformers is provided wherein each beamformer has an input and an output, the input of each beamformer receiving the output from each listening element. A switching device is interconnected between the listening elements and the beamformers for alternately switching the outputs of the listening elements to each beamformer between two modes, one mode being a predetermined order and the other mode being an inversion of the predetermined order. With this arrangement only one-half the ordinary number of beamformers is required, thereby significantly reducing the size and the weight of the scanning sonar.

OBJECTS OF THE INVENTION

An object of the present invention is to provide a miniaturized scanning sonar.

Another object is to provide an effective miniaturized scan within a pulse sonar which can be utilized on small unmanned undersea vehicles.

A further object is to provide a scanning sonar which is as effective as a scanning sonar which utilizes twice as many beamformers.

These and other objects of the invention will become more readily apparent from the ensuing specification when taken together with the drawings.

DESCRIPTION OF THE PREFERRED EMBODIMENT

Figure 1:
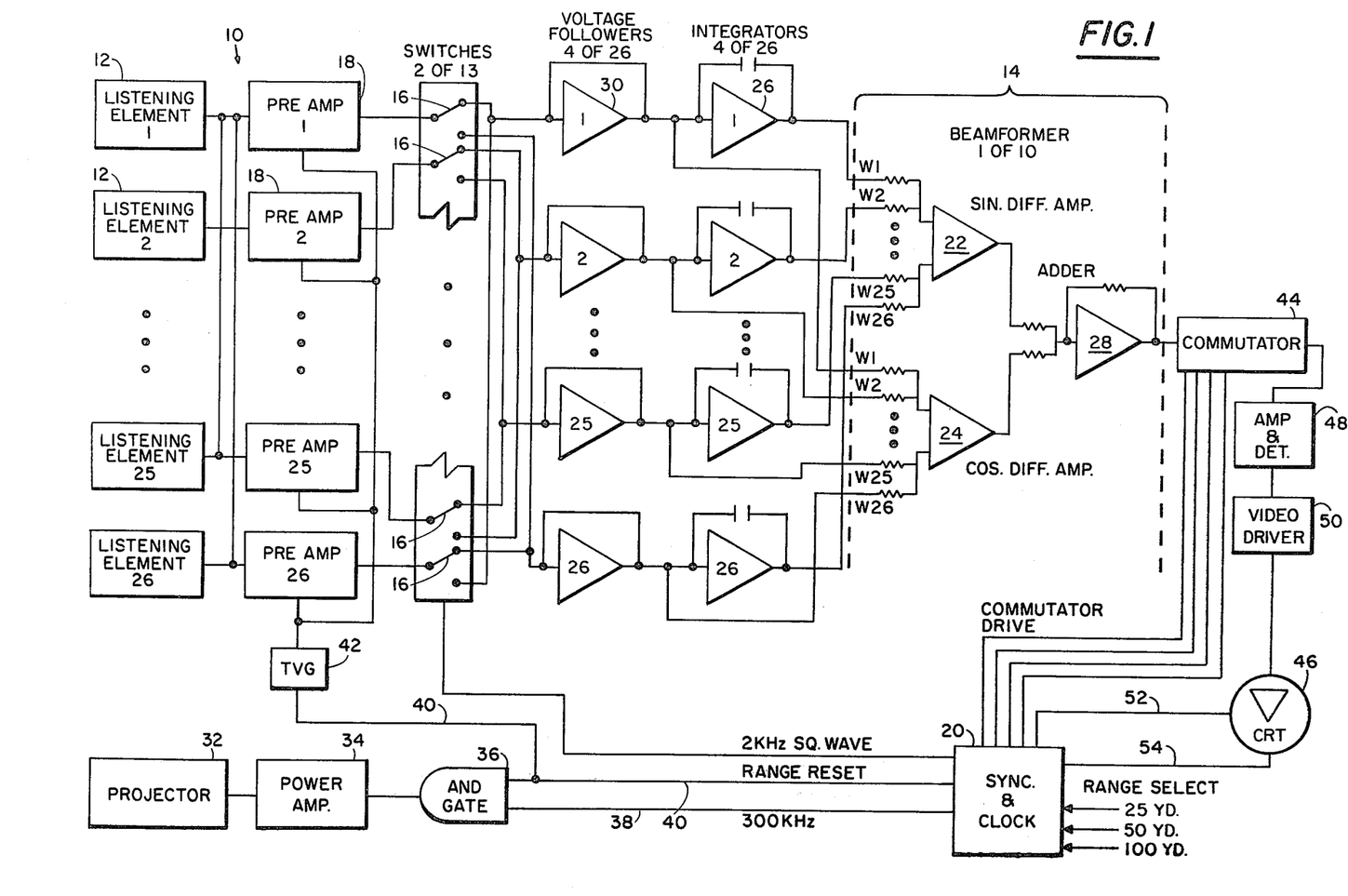
FIG. 1 is a schematic illustration of the present miniaturized scanning within a pulse sonar which is operating in one mode out of the two possible modes of operation.

Referring now to the drawings wherein like reference numerals designate like or similar parts throughout the several views there is illustrated in FIG. 1 a miniaturized scan within a pulse sonar 10. The sonar 10 includes a line array of N listening transducer elements 12, each listening element being capable of receiving an acoustic signal and outputting a corresponding electrical signal. The acoustical and electrical signals are illustrated schematically in FIG. 4. The number N selected for this particular embodiment is 26.

A plurality of beamformers 14 is provided, only one of the beamformers being fully illustrated in FIG. 1. Each beamformer has an input and an output, the input of each beamformer receiving the output from each listening element 12. Accordingly, the one beamformer illustrated completely in FIG. 1 receives the output from the listening elements 12, and each of the other beamformers also receives the output from the listening elements 12. The number of beamformers selected for this particular embodiment is 10. As will be explained hereinafter, this number is only one-half of the normally required number of beamformers because of the unique arrangement of the present invention.

Figure 2:
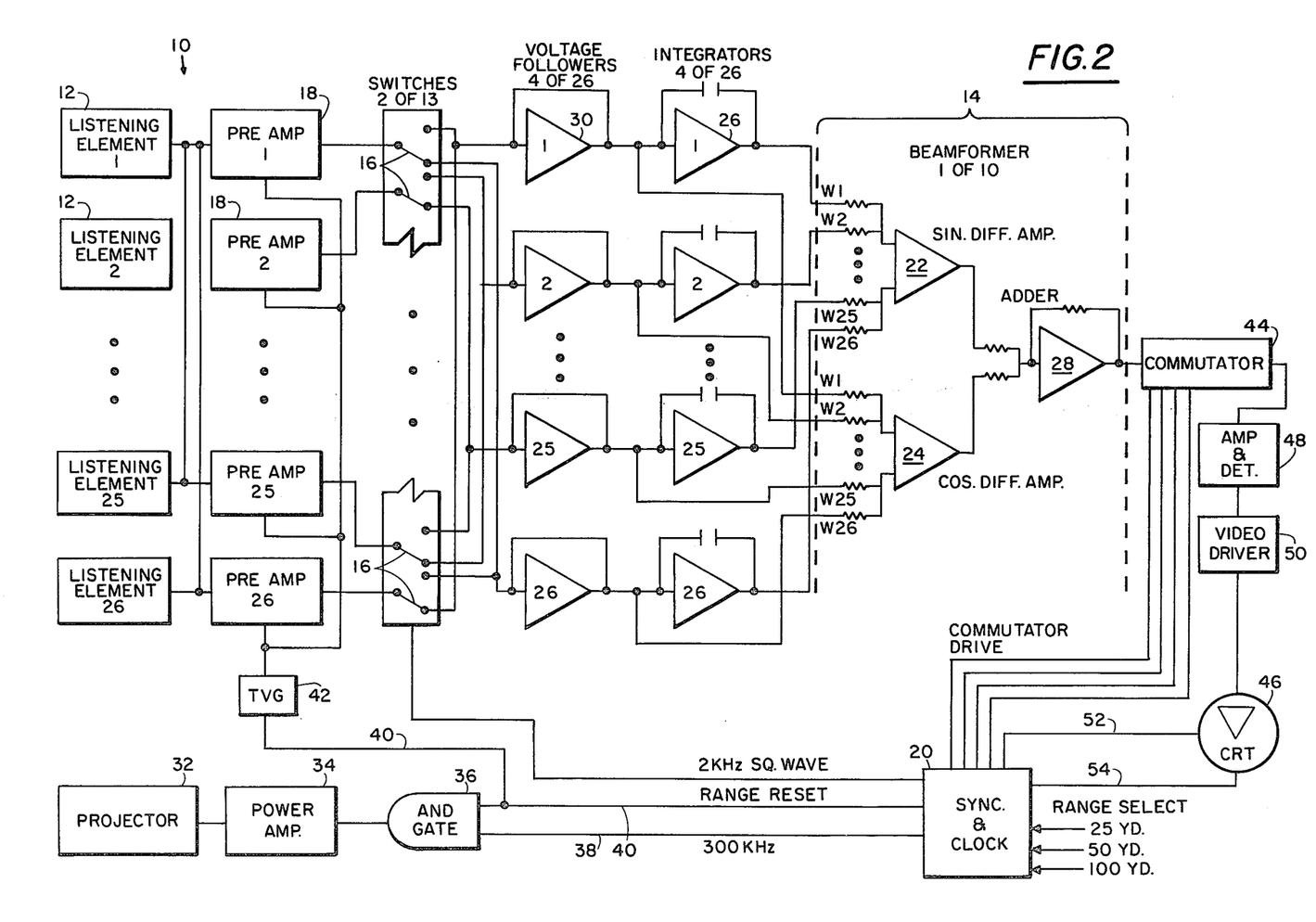
FIG. 2 is a schematic illustration of the present miniaturized scan within a pulse sonar which is operating in the other mode out of the two possible modes of operation.

Switch means 16 are interconnected between the listening elements 12 and the beamformers 14 for alternately switching the outputs of the listening elements to each beamformer between two modes, one mode being a predetermined order, as illustrated in FIG. 1, and the other mode being an inversion of the predetermined order, as illustrated in FIG. 2. The number of switches selected in the exemplary embodiment is 26, and the particular type of switch is a single pole double throw type. Preamplifiers 18 may be connected between the listening elements 12 and the switches 16, each preamplifier 18 corresponding to a respective listening element 12. With the present arrangement in the exemplary embodiment 26 such preamplifiers would be utilized. Each switch 16 includes a switch arm and top and bottom poles, as illustrated in FIG. 1. The switch arm of the top switch 16 is connected to the first preamplifier No. 1, the second switch 16 down is connected to the second preamplifier 18, and so on until the bottom switch 16 is connected to the bottom preamplifier No.

26. The top and bottom terminals of each switch 16 are connected to each beamformer 14 in a predetermined order which will be described in detail hereinafter. When the switch arms of the switches simultaneously contact all of the top terminals thereof the switch means is in one mode of operation, as illustrated in FIG. 1, and when the switch arms simultaneously contact all of the bottom terminals the switch means are in the other mode of operation, as illustrated in FIG. 2. The switches 16 are responsive to a sync and clock 20 which drives the switches alternately between the two modes. In the exemplary embodiment a two kHz square wave may be utilized for accomplishing this purpose.

Figure 3:
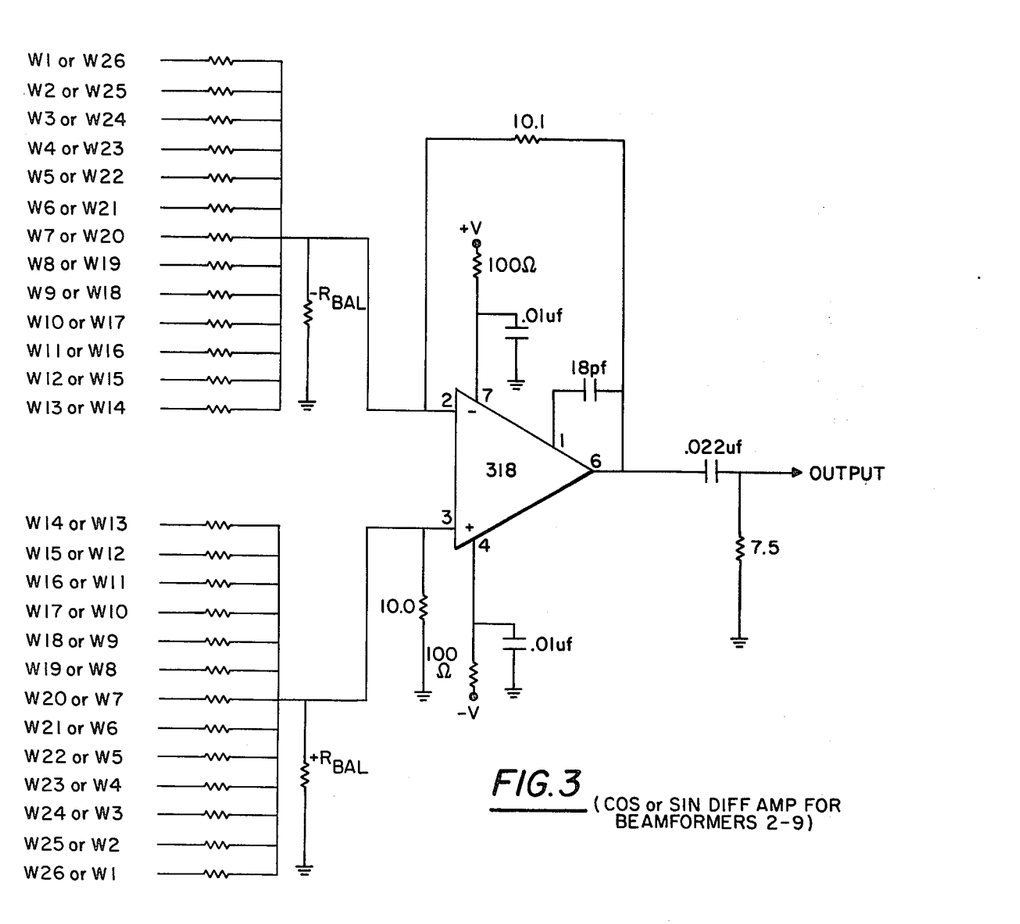
FIG. 3 is an enlarged and more complete schematic illustration of the sine or cosine differential amplifier of FIG. 1 or 2 for beamformers 2–10.
Figure 4:
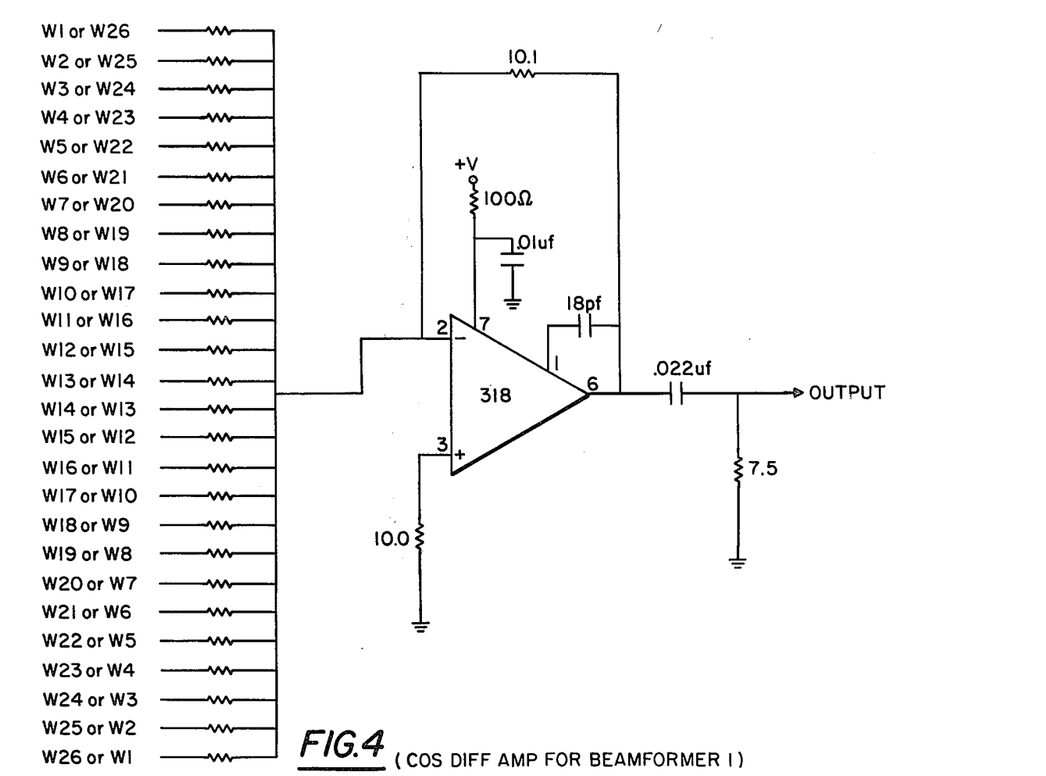
FIG. 4 is an enlarged and more complete schematic illustration of the cosine differential amplifier of FIGS. 1 and 2 for beamformer 1.

Each of the beamformers except a zero beamformer includes a sine differential amplifier 22 and a cosine differential amplifier 24. In reality, each of these differential amplifiers are identical, and the terms sine and cosine are utilized only because their inputs have that relationship as caused by a series of integrators 26 which are connected between each beamformer 14 and the switches 16. In the exemplary embodiment 26 such integrators would be utilized. The output from each integrator 26 is fed to each sine differential amplifier 22 of each beamformer, except the zero beamformer, via weighting resistors 1 through 26, and each integrator 26 is bypassed between the integrator and the respective switch for feeding inputs to the cosine differential amplifier 24 of each beamformer including the zero beamformer, via another set of weighting resistors 1 through 26. FIG. 3 illustrates a typical sine or cosine differential amplifier for each of the beamformers except the zero beamformer. It is important to note that the weighting resistors 1 through 13 are fed to the negative terminal of the differential amplifier, and the weighting resistors 14 through 26 are fed to the positive terminal thereof. FIG. 4 illustrates the differential amplifier for the zero beam beamformer. This differential amplifier receives only cosine signals and all 26 of the weighting resistors are fed to the negative terminal thereof. Each beamformer is concluded by an adder 28 which adds the outputs of the respective sine and cosine differential amplifiers 22 and 24 for all of the beamformers except the zero beam beamformer. The zero beam beamformer simply outputs from its cosine differential amplifier. Lastly, a voltage follower 30 may be connected between each integrator 26 and a respective switch 16 so as to give the amplified signals from the switches a low output impedance for driving the integrators 26 and the beamformer 14.

The miniaturized scan within a pulse sonar 10 further includes projector means 32 for transmitting a sound pulse. The projector is driven by the sync and clock 20 which may be provided with a range select such as 25, 50, and 100 yards. Interconnected between the projector 32 and the sync and clock 20 is a power amplifier 34 and an AND gate 36. The AND gate 36 receives a sound pulse frequency, such as 300 KHz, via a bottom lead 38 from the sync and clock 20, and receives a range reset signal from the sync and clock 20 via a lead 40 as dictated by the selection of the range 25, 50, or 100 yards. For instance, if the range select is 25 yards, the AND gate 36 causes the projector 32 to transmit a sound pulse and wait until the sound pulse travels through the water 25 yards out plus 25 yards back, assuming a target at the 25 yard range, at which time the AND gate 36 once again causes the projector to transmit another sound pulse and wait, and so on as long as the sonar is operating at the 25 yard range. The range reset lead 40 also goes to a time varying gain element 42 which controls the gain of each preamplifier 1 through 26 according to the time of the range reset.

A commutator 44 receives the output from each beamformer 14, and in turn has its output connected to a CRT display 46 via an amplifier and detector 48 and a video driver 50. The sync and clock 20 is connected to the commutator 44 for scanning all of the beamformers 14 each time the switch means 16 switches from one mode, as illustrated in FIG. 1, to the other mode, as illustrated in FIG. 2. Further, the sync and clock 20 is connected to the horizontal and vertical sweeps of the CRT 46 via lines 52 and 54 for synchronizing the sweep of the CRT display 46 with the scan of the commutator 44.

The sonar 10 described herein is a scan within a pulse type. This means that a pulse of sound energy is put into the water and the sonar scans through its complete sector coverage until the next transmit pulse is implemented. The exemplary sonar has a sector coverage of substantially 80° with substantially 4° wide beams. This means that there are 20 beams in the sector. As stated hereinabove the sonar has three range scales, namely: 25 yards, 50 yards, and 100 yards. As an example of a number of scans per transmit pulse, the 25 yard range can be considered. In the exemplary embodiment the transmit pulse length of the sonar is 500 microseconds, which equated to a sound pulse is two and a half feet long in water. This length is divided into 50 yards, 25 yards out and 25 yards back, which results in 60 scans. Thus, all 20 beams are scanned 60 times per pulse on the 25 yard range. The number of scans is doubled for the 50 yard range and doubled again for the 100 yard range. Accordingly, on the 25 yard range the sequence is transmit, scan the beamformer sixty times, then transmit again. The sync and clock 20 controls the scanning and transmitting so that the entire sector is covered for each pulse. It is significant however that although twenty beams are in the sector to be scanned that only ten beamformers are utilized in the present invention. This has been accomplished by switching the inputs to the beamformers between the one mode, as illustrated in FIG. 1, to the other mode, as illustrated in FIG. 2. This can be accomplished by connecting the poles of the switches 16 to the weighting resistors of the beamformers in a predetermined order as set forth hereinbelow. The switching between the two modes is in essence equivalent to physically inverting the transducer elements 1 through 26 end for end in the water half way during the scan of any particular sector.

Table 1, shown hereinbelow, is a full description of the connection of the transducer elements 12 and the corresponding switches 16 to the sine or cosine differential amplifiers 22 and 24 of the beamformers 14.

TABLE

| ELEMENT NO. | | BEAM 1 (0°) | | | | BEAM 2 (4°) | | | |
|---|---|---|---|---|---|---|---|---|---|
| MODE 1 | MODE 2 | COS | W | SIN | W | COS | W | SIN | W |
| 1 | 26 | −10.0 | 1 | | | 10.0 | 14 | | |
| 2 | 25 | −10.0 | 2 | | | 10.0 | 15 | | |
| 3 | 24 | −10.0 | 3 | | | 11.0 | 16 | 23.7 | 14 |

TABLE-continued

| | | | | | | | | |
|---|---|---|---|---|---|---|---|---|
| 4 | 23 | −10.0 | 4 | | 12.7 | 17 | 16.2 | 15 |
| 5 | 22 | −10.0 | 5 | | 15.8 | 18 | 13.0 | 16 |
| 6 | 21 | −10.0 | 6 | NO SIN | 21.5 | 19 | 11.0 | 17 |
| 7 | 20 | −10.0 | 7 | AMP | | | 10.5 | 18 |
| 8 | 19 | −10.0 | 8 | REQUIRE | | | 10.0 | 19 |
| 9 | 18 | −10.0 | 9 | | | | 10.0 | 20 |
| 10 | 17 | −10.0 | 10 | | −25.5 | 1 | 11.0 | 21 |
| 11 | 16 | −10.0 | 11 | | −16.9 | 2 | 12.1 | 22 |
| 12 | 15 | −10.0 | 12 | | −13.7 | 3 | 15.0 | 23 |
| 13 | 14 | −10.0 | 13 | | −11.5 | 4 | 20.5 | 24 |
| 14 | 13 | −10.0 | 14 | | −10.5 | 5 | | |
| 15 | 12 | −10.0 | 15 | | −10.0 | 6 | | |
| 16 | 11 | −10.0 | 16 | | −10.0 | 7 | | |
| 17 | 10 | −10.0 | 17 | | −10.5 | 8 | −28.0 | 1 |
| 18 | 9 | −10.0 | 18 | | −12.1 | 9 | −18.2 | 2 |
| 19 | 8 | −10.0 | 19 | | −14.0 | 10 | −14.0 | 3 |
| 20 | 7 | −10.0 | 20 | | −19.1 | 11 | −11.5 | 4 |
| 21 | 6 | −10.0 | 21 | | | | −10.5 | 5 |
| 22 | 5 | −10.0 | 22 | | | | −10.0 | 6 |
| 23 | 4 | −10.0 | 23 | | | | −10.0 | 7 |
| 24 | 3 | −10.0 | 24 | | | | −10.5 | 8 |
| 25 | 2 | −10.0 | 25 | | 19.1 | 20 | −11.5 | 9 |
| 26 | 1 | −10.0 | 26 | | 14.7 | 21 | −13.7 | 10 |
| | | $R_{BAL}$ | | | | $R_{BAL}$ | | |
| | | 0 | | 0 | | 4.02 | | −16.9 |

| ELEMENT NO. | | BEAM 3 (8°) | | | | BEAM 4 (12°) | | | |
|---|---|---|---|---|---|---|---|---|---|
| MODE 1 | MODE 2 | COS | W | SIN | W | COS | W | SIN | W |
| 1 | 26 | 10.0 | 14 | | | 10.0 | 14 | | |
| 2 | 25 | 11.0 | 15 | 23.7 | 14 | 12.7 | 15 | 16.2 | 14 |
| 3 | 24 | 15.8 | 16 | 13.0 | 15 | | | 10.5 | 15 |
| 4 | 23 | | | 10.5 | 16 | −26.7 | 1 | 11.0 | 16 |
| 5 | 22 | | | 10.0 | 17 | −11.5 | 2 | 20.0 | 17 |
| 6 | 21 | −17.4 | 1 | 12.1 | 18 | −10.0 | 3 | | |
| 7 | 20 | −11.5 | 2 | 20.0 | 19 | −14.0 | 4 | −14.0 | 1 |
| 8 | 19 | −10.0 | 3 | | | | | −10.0 | 2 |
| 9 | 18 | −10.5 | 4 | −28.0 | 1 | 20.5 | 16 | −11.5 | 3 |
| 10 | 17 | −14.0 | 5 | −14.0 | 2 | 11.0 | 17 | −25.5 | 4 |
| 11 | 16 | | | −10.5 | 3 | 10.5 | 18 | | |
| 12 | 15 | | | −10.0 | 4 | 15.8 | 23 | 12.7 | 18 |
| 13 | 14 | 20.0 | 17 | −11.5 | 5 | | | 10.0 | 19 |
| 14 | 13 | 12.1 | 18 | −17.4 | 6 | −16.9 | 5 | 12.7 | 20 |
| 15 | 12 | 10.0 | 19 | | | −10.5 | 6 | | |
| 16 | 11 | 10.5 | 20 | | | −11.0 | 7 | −28.0 | 5 |
| 17 | 10 | 13.0 | 21 | 15.0 | 20 | −19.1 | 8 | −11.5 | 6 |
| 18 | 9 | 24.9 | 22 | 11.0 | 21 | | | −10.0 | 7 |
| 19 | 8 | | | 10.0 | 22 | 14.7 | 19 | −13.7 | 8 |
| 20 | 7 | −22.6 | 6 | 11.0 | 23 | 10.0 | 20 | | |
| 21 | 6 | −12.7 | 7 | 15.8 | 24 | 11.5 | 21 | 21.5 | 21 |
| 22 | 5 | −10.5 | 8 | | | 24.9 | 22 | 11.0 | 22 |
| 23 | 4 | −10.0 | 9 | | | | | 10.5 | 23 |
| 24 | 3 | −12.1 | 10 | −16.9 | 7 | −13.0 | 9 | 15.8 | 24 |
| 25 | 2 | −20.5 | 11 | −11.5 | 8 | −10.0 | 10 | | |
| 26 | 1 | | | −10.0 | 9 | −12.1 | 11 | −17.4 | 9 |
| | | | | $R_{BAL}$ | | | | $R_{BAL}$ | |
| | | 6.34 | | −6.04 | | 12.7 | | −4.64 | |

| ELEMENT NO. | | BEAM 5 (16°) | | | | BEAM 6 (20°) | | | |
|---|---|---|---|---|---|---|---|---|---|
| MODE 1 | MODE 2 | COS | W | SIN | W | COS | W | SIN | W |
| 1 | 26 | 10.0 | 14 | | | 10.0 | 14 | | |
| 2 | 25 | 15.0 | 15 | 13.0 | 14 | 20.5 | 15 | 11.5 | 14 |
| 3 | 24 | | | 10.0 | 15 | −18.2 | 1 | 12.1 | 15 |
| 4 | 23 | −11.5 | 1 | 19.1 | 16 | −10.0 | 2 | | |
| 5 | 22 | −10.5 | 2 | | | −24.9 | 3 | −11.0 | 1 |
| 6 | 21 | −26.7 | 3 | −11.0 | 1 | 16.2 | 16 | −12.7 | 2 |
| 7 | 20 | 21.5 | 16 | −11.0 | 2 | 10.0 | 17 | | |
| 8 | 19 | 10.0 | 17 | | | | | 10.5 | 16 |
| 9 | 18 | 12.7 | 18 | 16.9 | 17 | −14.7 | 4 | 13.7 | 17 |
| 10 | 17 | | | 10.0 | 18 | −10.5 | 5 | | |
| 11 | 16 | −13.7 | 4 | 14.7 | 19 | | | −10.5 | 3 |
| 12 | 15 | −10.0 | 5 | | | 13.7 | 18 | −14.7 | 4 |
| 13 | 14 | −17.4 | 6 | −12.1 | 3 | 10.5 | 19 | | |
| 14 | 13 | | | −10.5 | 4 | | | 10.0 | 18 |
| 15 | 12 | 11.0 | 19 | −23.7 | 5 | −12.7 | 6 | 16.2 | 19 |
| 16 | 11 | 11.0 | 20 | 24.9 | 20 | −11.0 | 7 | −24.9 | 5 |
| 17 | 10 | | | 10.5 | 21 | | | −10.0 | 6 |
| 18 | 9 | −18.2 | 7 | 12.1 | 22 | 12.1 | 20 | −18.2 | 7 |
| 19 | 8 | −10.0 | 8 | | | 11.5 | 21 | 21.5 | 20 |
| 20 | 7 | −13.7 | 9 | −14.7 | 6 | | | 10.0 | 21 |

TABLE-continued

| | | | | | | | | | |
|---|---|---|---|---|---|---|---|---|---|
| 21 | 6 | | | −10.0 | 7 | −11.5 | 8 | 20.5 | 22 |
| 22 | 5 | 12.7 | 21 | −16.2 | 8 | −12.1 | 9 | −18.2 | 8 |
| 23 | 4 | 10.0 | 22 | | | | | −10.0 | 9 |
| 24 | 3 | 20.5 | 23 | 11.5 | 23 | 11.0 | 22 | −24.9 | 10 |
| 25 | 2 | −28.0 | 10 | 10.5 | 24 | 12.7 | 23 | 16.2 | 23 |
| 26 | 1 | −10.5 | 11 | | | | | 10.0 | 24 |
| | | $R_{BAL}$ | | | | $R_{BAL}$ | | | |
| | | 12.1 | | −4.42 | | −8.45 | | −7.5 | |

| ELEMENT NO. | | BEAM 7 (24°) | | | | BEAM 8 (28°) | | | |
|---|---|---|---|---|---|---|---|---|---|
| MODE 1 | MODE 2 | COS | W | SIN | W | COS | W | SIN | W |
| 1 | 26 | 10.0 | 14 | | | 10.0 | 14 | | |
| 2 | 25 | | | 10.5 | 14 | | | 10.0 | 14 |
| 3 | 24 | −12.1 | 1 | 18.2 | 15 | −10.0 | 1 | | |
| 4 | 23 | −13.0 | 2 | −15.8 | 1 | | | −10.5 | 1 |
| 5 | 22 | 25.5 | 15 | −11.0 | 2 | 10.5 | 15 | −26.7 | 2 |
| 6 | 21 | 10.0 | 16 | | | 21.5 | 16 | 11.5 | 15 |
| 7 | 20 | | | 10.0 | 16 | −12.1 | 2 | 18.2 | 16 |
| 8 | 19 | −11.5 | 3 | 21.5 | 17 | −15.8 | 10 | −12.7 | 3 |
| 9 | 18 | −14.0 | 4 | −14.0 | 3 | 14.0 | 17 | −14.7 | 4 |
| 10 | 17 | 20.5 | 17 | −11.5 | 4 | 13.0 | 18 | 15.0 | 17 |
| 11 | 16 | 10.0 | 18 | | | −17.4 | 3 | 12.1 | 18 |
| 12 | 15 | | | 10.0 | 18 | −11.5 | 4 | −20.5 | 5 |
| 13 | 14 | −10.5 | 5 | 26.7 | 19 | 24.9 | 19 | −11.0 | 6 |
| 14 | 13 | −16.2 | 6 | −12.7 | 5 | 10.5 | 20 | | |
| 15 | 12 | 17.4 | 19 | −12.1 | 6 | | | 10.5 | 19 |
| 16 | 11 | 10.5 | 20 | | | −10.0 | 5 | | |
| 17 | 10 | | | 10.0 | 20 | | | −10.0 | 7 |
| 18 | 9 | −10.5 | 7 | | | 10.0 | 21 | | |
| 19 | 8 | −19.1 | 8 | −12.1 | 7 | | | 10.0 | 20 |
| 20 | 7 | 15.0 | 21 | −13.0 | 8 | −10.0 | 6 | | |
| 21 | 6 | 11.0 | 22 | 24.9 | 21 | −30.1 | 7 | −10.5 | 8 |
| 22 | 5 | | | 10.0 | 22 | 11.0 | 22 | −23.7 | 9 |
| 23 | 4 | −10.0 | 9 | | | 19.1 | 23 | 11.5 | 21 |
| 24 | 3 | −22.6 | 10 | −11.0 | 9 | −12.1 | 8 | 16.9 | 22 |
| 25 | 2 | 13.7 | 23 | −14.7 | 10 | −15.0 | 9 | −13.7 | 10 |
| 26 | 1 | 11.5 | 24 | 20.0 | 23 | 14.7 | 24 | −13.7 | 11 |
| | | $R_{BAL}$ | | | | $R_{BAL}$ | | | |
| | | −11.5 | 14.0 | | | −15.0 | 13.0 | | |

| ELEMENT NO. | | BEAM 9 (33°) | | | | BEAM 10 (38°) | | | |
|---|---|---|---|---|---|---|---|---|---|
| MODE 1 | MODE 2 | COS | W | SIN | W | COS | W | SIN | W |
| 1 | 26 | 10.0 | 14 | | | 10.0 | 14 | | |
| 2 | 25 | | | 10.0 | 14 | −28.0 | 1 | 10.5 | 14 |
| 3 | 24 | −10.5 | 1 | | | −13.7 | 2 | −15.0 | 1 |
| 4 | 23 | 24.9 | 15 | −11.0 | 1 | 11.5 | 15 | −21.5 | 2 |
| 5 | 22 | 11.5 | 16 | 19.1 | 15 | | | 10.0 | 15 |
| 6 | 21 | −15.8 | 2 | 13.0 | 16 | −10.5 | 3 | | |
| 7 | 20 | −15.0 | 3 | −13.7 | 2 | 17.4 | 16 | −12.1 | 3 |
| 8 | 19 | 12.1 | 17 | −18.2 | 3 | 17.4 | 17 | 12.1 | 16 |
| 9 | 18 | 22.6 | 18 | 11.0 | 17 | −10.5 | 4 | | |
| 10 | 17 | −10.5 | 4 | | | | | −10.0 | 4 |
| 11 | 16 | | | −10.0 | 4 | 11.5 | 18 | 21.5 | 17 |
| 12 | 15 | 10.0 | 19 | | | −13.0 | 5 | 15.0 | 18 |
| 13 | 14 | | | 10.0 | 18 | −28.0 | 6 | 10.5 | 5 |
| 14 | 13 | −10.5 | 5 | | | 10.0 | 19 | | |
| 15 | 12 | 26.7 | 20 | −11.0 | 5 | −28 | 7 | 10.5 | 19 |
| 16 | 11 | 11.5 | 21 | 20.0 | 19 | −13.7 | 8 | −14.7 | 6 |
| 17 | 10 | −16.2 | 6 | 12.7 | 20 | 11.0 | 20 | −21.5 | 7 |
| 18 | 9 | −14.7 | 7 | −13.7 | 6 | | | 10.0 | 20 |
| 19 | 8 | 12.1 | 22 | −17.4 | 7 | −10.5 | 9 | | |
| 20 | 7 | 21.5 | 23 | 11.5 | 21 | 17.4 | 21 | −12.1 | 8 |
| 21 | 6 | −10.5 | 8 | | | 18.2 | 22 | 12.1 | 21 |
| 22 | 5 | | | −10.0 | 8 | −10.5 | 10 | | |
| 23 | 4 | 10.0 | 24 | | | | | −10.0 | 9 |
| 24 | 3 | | | 10.0 | 22 | 11.5 | 23 | 20.5 | 22 |
| 25 | 2 | −10.0 | 9 | | | −13.0 | 11 | 15.0 | 23 |
| 26 | 1 | 28.0 | 25 | −10.5 | 9 | | | −10.5 | 10 |
| | | $R_{BAL}$ | | | | $R_{BAL}$ | | | |
| | | −10.5 | | −1.2 M | | 68.1 | | −549.0 | |

Figure 5:
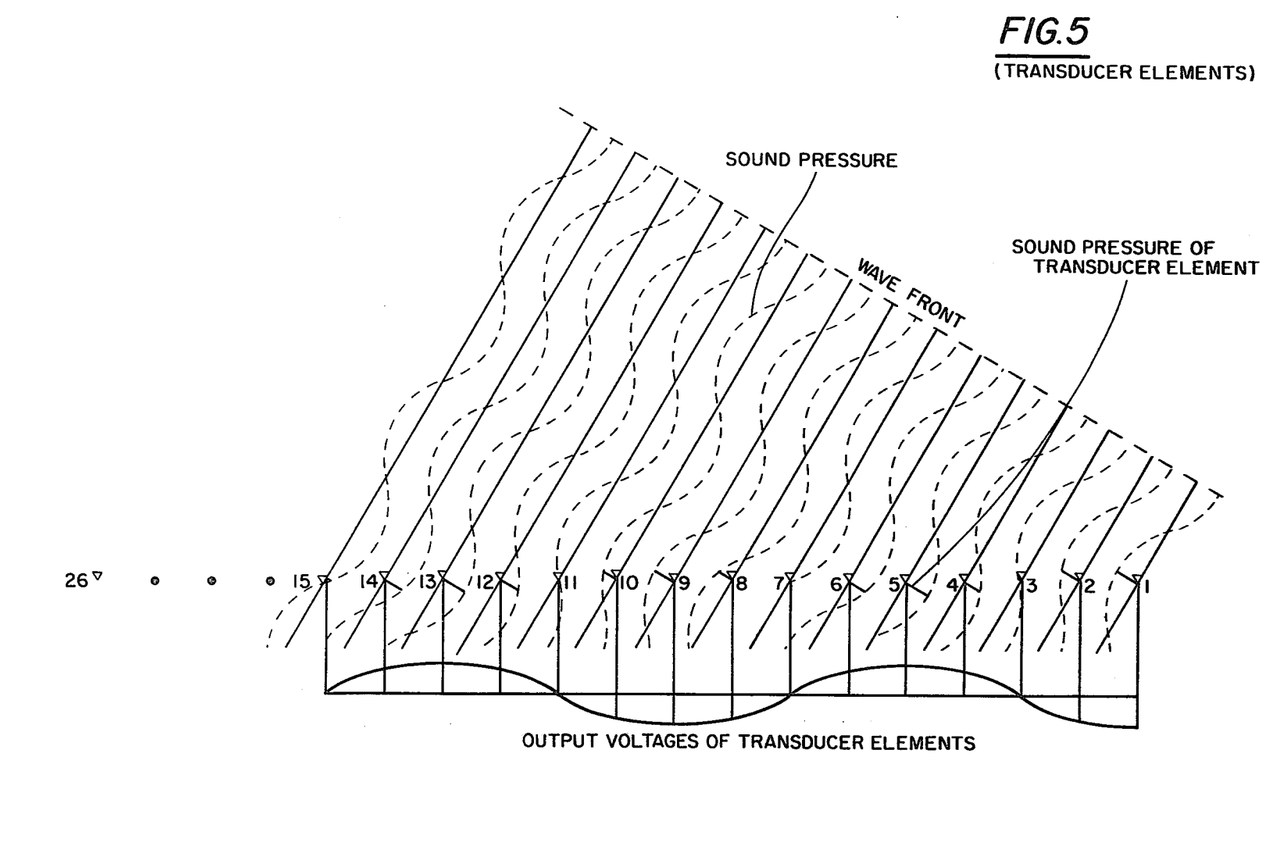
FIG. 5 is a schematic illustration of the various outputs from a line array of listening transducer elements which are receiving sound pressure waves from an underwater sound source.

The above table can be derived from a vector analysis computation of the expected output voltages of the transducer elements from sound waves from twenty different directions approximately four degrees apart. A sound wave from a particular direction is illustrated in FIG. 5, illustrating the expected outputs from the transducer elements at a particular instant of time. By a vector analysis the weighting resistors into the sine and cosine differential amplifiers 22 and 24 can be weighted to cause one of the beamformers to look substantially only in the direction of the wavefront illustrated in FIG. 5. The wavefront can then be shifted and the weighting resistors for another beamformer weighted in such a manner so as to look in another direction for the wavefront. Since Beam 1 in the table is the 0° beam all of the resistors are the same, such as 10,000 ohms. All 26 of the outputs from the transducer elements are fed to the negative terminal of the cosine differential amplifier, as illustrated in FIG. 4. With the 0° beam beamformer the sine differential amplifier is not required. The remaining beamformers 2 through 10 have varying resistor weights and are fed in a predetermined order to either the negative or positive terminal of the respective differential amplifiers.

Referring to the above table and FIG. 5, when the sign of the output from a particular transducer is positive for a particular direction of a wavefront the output from the transducer is fed to the positive terminal of a differential amplifier, and when the sign is negative the output of the transducer element is sent to the negative terminal of the differential amplifier. In some instances there is no value shown for a weighting resistor in the table, and this was done because the weighting resistor exceeded approximately 30,500 ohms which would have little effect on the operation of the beamformer. In these instances the respective transducer elements were not connected to the beamformers and are shown as a blank in the table. Each of the beamformers 2 through 10 also have a resistor balance to ground between the weighting resistors and the respective negative or positive terminal of the differential amplifier. The values are shown in the table and the location of the balance resistors are illustrated in FIG. 3.

Obviously, many modifications and variations of the present invention are possible in the light of the above teachings, and, it is therefore understood that within the scope of the disclosed inventive concept, the invention may be practiced otherwise than specifically described.

What is claimed is:

1. In a scanning sonar the improvement comprising:
a line array of N listening transducer elements, each listening element being capable of receiving an acoustic signal and outputting a corresponding electrical signal;
a plurality of beamformers, each beamformer having an input and an output, the input of each beamformer receiving the outputs of the listening elements; and
switch means interconnected between the listening elements and the beamformers for alternately switching the outputs of the listening elements to each beamformer between two modes, one mode being a predetermined order and the other mode being an inversion of said predetermined order.

2. An improvement as claimed in claim 1 wherein at least some of the beamformers includes:
a sine differential amplifier and a cosine differential amplifier, each differential amplifier having a positive input, a negative input, and an output;
N/2 input leads connected between the switch means and each respective input of each differential amplifier;
a resistor interconnected in each input lead and having a resistance in relationship to the resistors in the other input leads to establish the width and direction of the beam of each respective beamformer;
each differential amplifier input lead being capable of receiving the input from one or the other of a pair of preselected listening elements depending upon the particular mode of the switch means;
an adder having an input and an output; and
the outputs of each differential amplifier being connected to the input of said adder.

3. An improvement as claimed in claim 2 including:
an integrator connected between the switch means and the resistor in each input lead to said sine differential amplifier.

4. An improvement as claimed in claim 3 including:
a commutator which has an input and an output;
the output of each beamformer being connected to the input of the commutator;
clocking means connected to the commutator for scanning all of the beamformers each time the switch means switches from one mode to the other mode.

5. An improvement as claimed in claim 4 including:
a CRT display;
a detector connected between the output of the commutator and the CRT display;
the clocking means also including means for synchronizing the sweep of the CRT display with the scan of the commutator.

6. A miniaturized scan within a pulse sonar comprising:
a line array of N listening transducer elements, each listening element being capable of receiving an acoustic signal and outputting a corresponding electrical signal;
a plurality of beamformers, each beamformer having an input and an output, the input of each beamformer receiving the output from each listening element;
switch means interconnected between the listening elements and the beamformers for alternately switching the outputs of the listening elements to each beamformer between two modes, one mode being a predetermined order and the other mode being an inversion of said predetermined order;
display means;
commutator means receiving the output of each beamformer and connected to the display means; and
projector means for transmitting a sound pulse;
synchronization and clocking means connected to the commutator, display means and projector means for activating the projector means to transmit a sound pulse, and then activating the commutator means and display means in synchronization to scan the outputs of the beamformers and present the result on the display means.

7. A sonar as claimed in claim 6 including:
a sine differential amplifier and a cosine differential amplifier, each differential amplifier having a positive input, a negative input, and an output;
N/2 input leads connected between the switch means and each respective input of each differential amplifier;
a resistor interconnected in each input lead and having a resistance in relationship to the resistors in the other input leads to establish the width and direction of the beam of each respective beamformer;
each differential amplifier input lead being capable of receiving the input from one or the other of a pair of preselected listening elements depending upon the particular mode of the switch means;
an adder having an input and an output; and the outputs of each differential amplifier being connected to the input of said adder.

8. A sonar as claimed in claim 7 including:

an integrator connected between the switch means and the resistor in each input lead to said sine differential amplifier.

9. A sonar as claimed in claim 8 including:

a preamplifier connected between each listening element and the switch means;

time varying gain means connected between each preamplifier and the clocking and synchronization means; and the clocking and synchronization means activating the time varying gain means in synchronization with the scan of said beamformers.

* * * * *